F. D. HOLDSWORTH.
LUBRICATING DEVICE.
APPLICATION FILED JUNE 21, 1911.

1,019,645.

Patented Mar. 5, 1912.

2 SHEETS—SHEET 1.

Witnesses:
Horace A. Crossman
Carl L. Choate

Inventor:
Fred D. Holdsworth
by Mary Booth James Varney
Attys

F. D. HOLDSWORTH.
LUBRICATING DEVICE.
APPLICATION FILED JUNE 21, 1911.
1,019,645.
Patented Mar. 5, 1912.
2 SHEETS—SHEET 2.
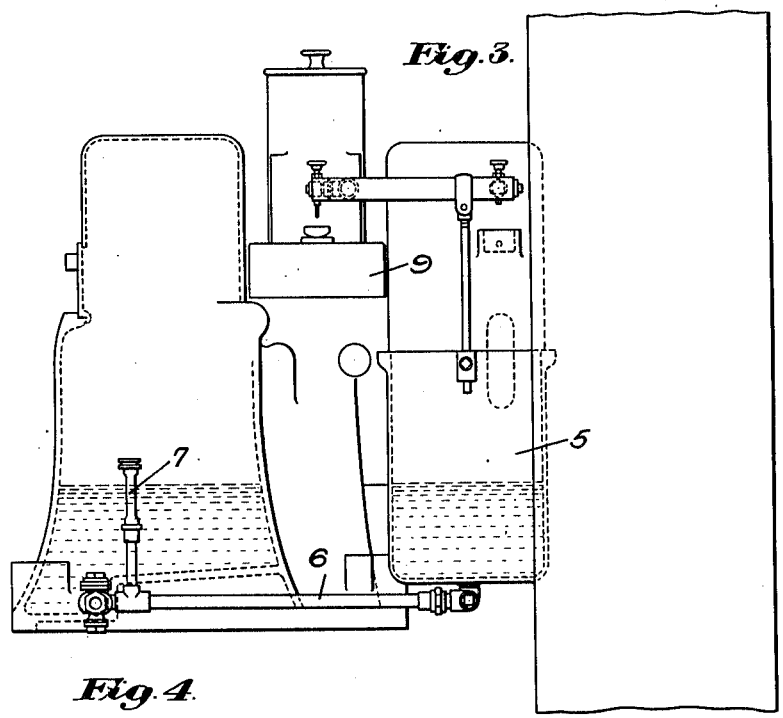
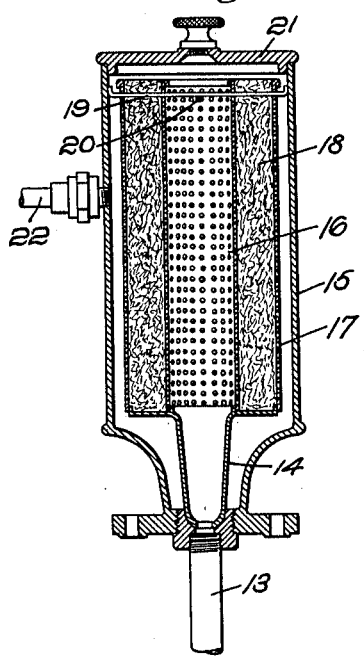
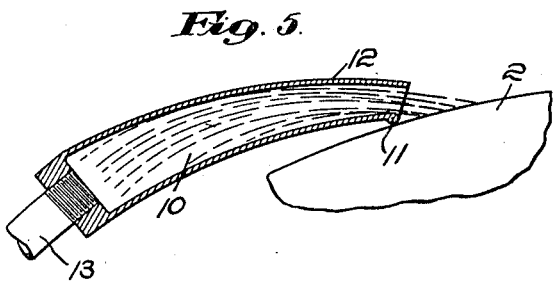
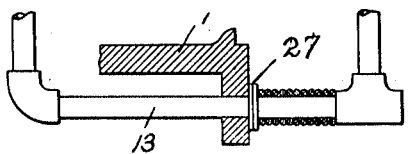
Witnesses:
Carl L. Choate.
Horace A. Croseman
Inventor:
Fred D. Holdsworth.
by Emery Booth, Janney Varney
Attys.

UNITED STATES PATENT OFFICE.

FRED D. HOLDSWORTH, OF CLAREMONT, NEW HAMPSHIRE, ASSIGNOR TO SULLIVAN MACHINERY COMPANY, OF CLAREMONT, NEW HAMPSHIRE, A CORPORATION OF MAINE.

LUBRICATING DEVICE.

1,019,645.  Specification of Letters Patent.  Patented Mar. 5, 1912.

Application filed June 21, 1911. Serial No. 634,415.

*To all whom it may concern:*

Be it known that I, FRED D. HOLDSWORTH, a citizen of the United States, and a resident of Claremont, county of Sullivan, State of New Hampshire, (whose post-office address is Claremont, New Hampshire,) have invented an Improvement in Lubricating Devices, of which the following description, in connection with the accompanying drawings, is a specification, like characters on the drawings representing like parts.

This invention consists of improvements in lubricating devices particularly adapted for use in connection with lubricating devices for engines.

The invention will be best understood by reference to the following description when taken in connection with the accompanying illustration of one specific embodiment thereof, while its scope will be more particularly pointed out in the appended claims.

Figure 1:
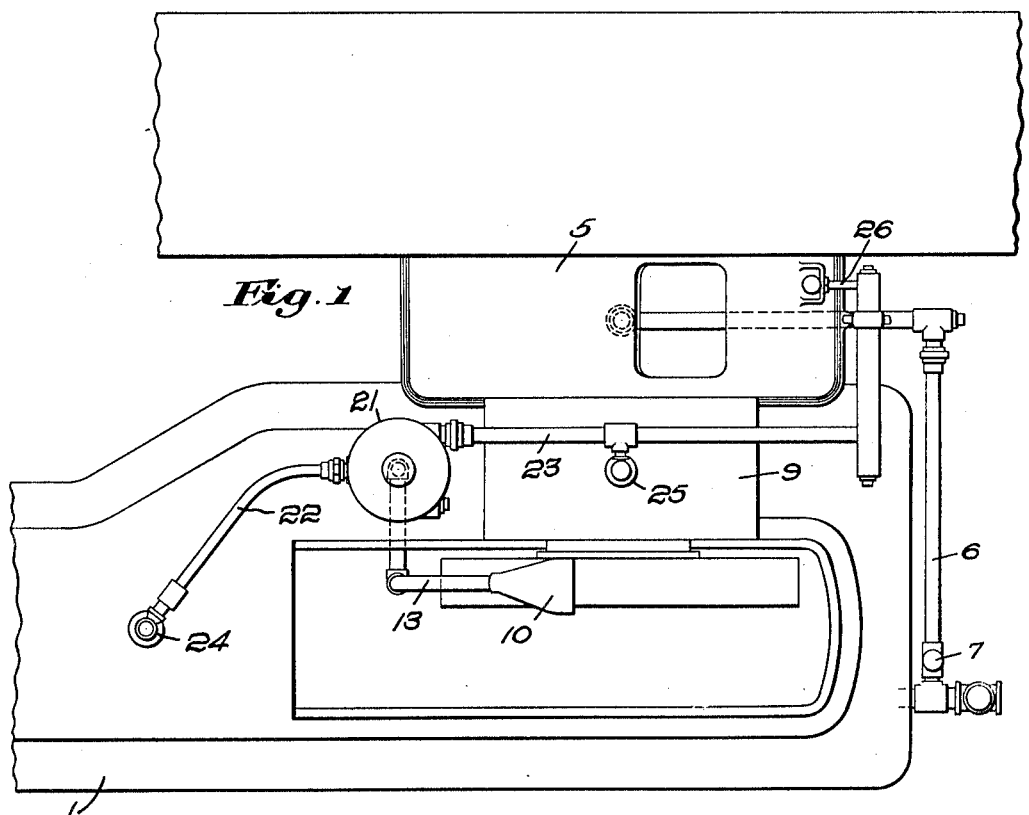
Figure 2:
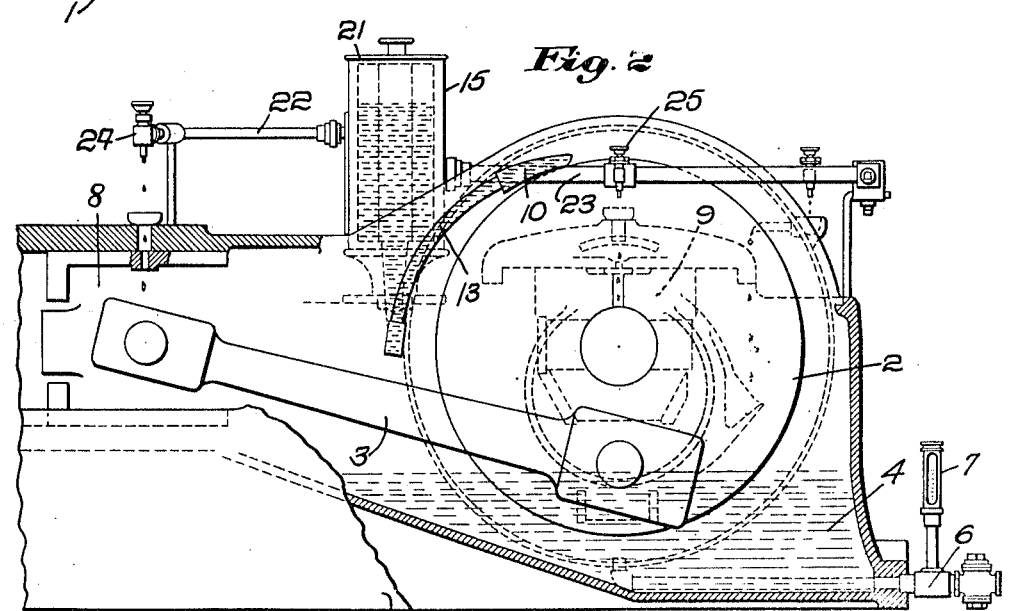

In the drawings, Figure 1 is a plan view of the crank chamber and associated parts of an engine equipped with one form of the invention. Fig. 2 is a sectional elevation taken through the crank chamber. Fig. 3 is an end elevation of the crank chamber showing the oil receiving tank and the distributing pipes. Fig. 4 is a section through the oil-receiving tank. Fig. 5 is a section showing the oil interceptor and deflector and its relation to the crank disk; and Fig. 6 shows a detail of the lubricant supply pipe.

Referring to the drawings and to the illustrative embodiment of the invention therein shown, at 1 there is represented a portion of the bed plate or frame work of a steam compressing engine having the crank disk 2 and connecting rod 3. The crank chamber is in the form of a well adapted to contain a supply of oil or other lubricant 4 in which the rotatable crank disk is partly immersed. A supply of oil is maintained in the crank chamber shown, and also in an adjacent chamber 5 for the valve eccentrics, equalization of the oil in the two chambers being provided for by the connecting pipe 6 provided with the gage glass 7.

In the disclosed form of engine, the action of the crank disk in the oil 4 is relied upon to distribute oil to the various parts of the engine which are required to be constantly lubricated, while the machine is in operation, such as the cross head 8, the bearing box 9 and the valve eccentrics in the chamber 5. Heretofore it has been proposed to distribute oil to these various parts by scraping it from the crank disk as the latter rotates and allowing the oil thus scraped or intercepted to flow by gravity alone to lubricating devices arranged at a lower level. It has also been proposed to lubricate certain parts by utilizing the current or flow of oil contained in the bottom of the crank chamber as it is agitated by the rotation of the crank disk to drive a portion of the lubricant into a collector arranged in the body of oil and lift it to the lubricating devices, the latter located at a higher level.

The present invention presents a marked improvement over both the described arrangements, the oil being intercepted and removed from the disk but at such a position as to take full advantage of the high velocity attained by such portion of the oil as clings to the disk in its rapid movement. When intercepted it is deflected by a suitable deflecting wall so that its dynamic head is utilized under the most favorable circumstances and it is caused to force the oil in advance of it into a suitable receiver arranged at a higher level from which it can be distributed by gravity to any required part of the machine.

Referring to the drawings, the intercepting and deflecting member is shown in Figs. 1, 2 and 5 and comprises a slightly flared receiver 10 held fixed in close operative relation to the face of the disk and preferably, though not necessarily, in contact therewith as represented in Fig. 5. In Fig. 5 the lower lip 11 of the deflector is shown as resting against the face of the crank disk, so that the oil which is carried over by the crank disk and by the time it reaches the deflector has acquired a high velocity, is intercepted and driven into the open mouth of the receiver. The top of the intercepter is closed by the deflecting wall 12 so that the oil which is driven into the same is deflected downwardly and forced into the supply pipe 13 which connects with the rear end of the receiver.

The supply pipe passes out through the casing and into the lower end of a suitable receiving tank. The latter consists of an inner casing 14 and an outer casing 15, the pipe 13 connecting with the interior of the inner casing. The inner casing 14 supports a perforated sheet metal cylinder 16 to the interior of which the oil is delivered and also an outer perforated sheet metal cylinder 17, the two perforated cylinders being separated by a body of straining material 18, such as curled hair, through which communication between the inner oil-receiving cylinder the interior of the outer casing is had so that the oil is filtered in passing therethrough. The oil is retained within the outer casing acting as a holder or reservoir and distributed therefrom through distributing pipes which may be of any suitable number and having any suitable location according to the number and position of the parts to be lubricated. Pieces of wire 19 and 20 arranged at right angles are inserted through the upper parts of the perforated sheet metal cylinders so as to maintain the same central within the outer casing 15. The sheet metal cylinders are soldered or otherwise secured to the inner casing 14 and the latter is removable from the outer casing so that by removing the top 21 of the tank, the cylinders and inner casing can be removed as a unit and the straining material cleaned.

The intercepter is applied to the crank disk on the upper side thereof and preferably at or about the position shown. This position may be varied more or less according to the normal speed velocity of the crank disk, but at approximately the position shown the oil can not only be more readily and effectively intercepted but acquires its greatest velocity so that the apparatus is most effective in utilizing the dynamic head of the oil. With the apparatus operated at normal speed, the disk-adhering oil, which is intercepted and driven in a substantially tangential direction into the receiver, will pass down the supply pipe 13 and up into the receiver 15, maintaining a head substantially as shown in Fig. 2 under which it may be distributed to the various parts to be lubricated. The employment of a receiver equalizes the head under slight variations of speed or cessations of supply due to any other cause. The utilization of the dynamic head of the oil taken from the upper side of the crank disk, particularly in conjunction with the receiver, renders the lubrication of the apparatus not only automatic, but certain and positive.

Herein for the purposes of illustration I have shown leading from the receiver 15 oil distributing conduits 22 and 23, the former supplying the cross head lubricator 24 and the latter a bearing lubricator 25 and also lubricating conduit 26 for the chamber 5.

The supply pipe 13 where it passes through the casing as shown in Fig. 6 is provided with a spring pressed washer 27 which prevents the exit of oil from the casing which may be spattered thereagainst by the action of the crank disk.

While I have herein shown and described for purposes of illustration one specific form of the invention, it is to be understood that the same is not limited to the details of construction herein shown nor to the specific arrangement of parts, but that extensive deviations may be made therefrom without departing from the spirit of the invention.

Claims.

1. In a lubricating device, the combination with an oil chamber adapted to contain lubricant of a rotatable disk arranged to be partially immersed in the lubricant, a lubricant intercepter and deflector located with its mouth operatively related to the upper side of said disk and inclined toward said disk in a direction opposite to the rotation thereof to intercept the high velocity disk-adhering lubricant raised from the main lubricant body, and an oil distributing conduit, said intercepter and deflector having a deflecting wall to utilize the dynamic head of the moving disk-adhering lubricant and force the same into said oil distributing conduit.

2. In a lubricating device, the combination with an oil chamber adapted to contain lubricant, of a rotatable disk arranged to be partially immersed in the lubricant, a lubricant intercepter and deflector located with its mouth operatively related to the upper side of said disk and inclined toward said disk in a direction opposite to the rotation thereof to remove the lubricant therefrom, a supply pipe, said intercepter and deflector having a deflecting wall to utilize the dynamic head of the moving disk-adhering lubricant and force the same into said supply pipe a receiver connected with said supply pipe to hold a quantity of the lubricant under said dynamic head, and means for distributing the lubricant from said receiver.

3. In a lubricating device, the combination with a chamber adapted to contain lubricant, a rotatable disk arranged to be partly immersed in the lubricant, a lubricant intercepter and deflector located in operative relation to the surface of the disk and inclined toward said disk in a direction opposed to the direction of rotation thereof to intercept the high velocity disk-adhering lubricant raised from the main lubricant body, a supply pipe, said intercepter and deflector having a deflecting wall to utilize the dynamic head of the moving lubricant and force the same into the said supply pipe, a receiver connected with said supply pipe to hold a quantity of the lubricant under said dynamic head and means for distributing said lubricant from said receiver.

In testimony whereof, I have signed my name to this specification, in the presence of two subscribing witnesses.

FRED D. HOLDSWORTH.

Witnesses:
CHAUNCEY L. CANN,
E. A. TRACY.